US009718230B2

(12) United States Patent
Pettey et al.

(10) Patent No.: US 9,718,230 B2
(45) Date of Patent: Aug. 1, 2017

(54) MULTILAYER BLOWN FILMS FOR SHRINK APPLICATIONS

(71) Applicant: Chevron Phillips Chemical Company LP, The Woodlands, TX (US)

(72) Inventors: Clifford C. Pettey, Fleming, OH (US); Charlie Rees, Copan, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 480 days.

(21) Appl. No.: 14/454,764

(22) Filed: Aug. 8, 2014

(65) Prior Publication Data

US 2014/0346714 A1    Nov. 27, 2014

Related U.S. Application Data

(62) Division of application No. 13/106,008, filed on May 12, 2011, now Pat. No. 9,174,377.

(51) Int. Cl.
| B29C 47/00 | (2006.01) |
| B29C 47/06 | (2006.01) |
| B32B 25/16 | (2006.01) |
| B32B 27/30 | (2006.01) |
| B32B 27/32 | (2006.01) |

(Continued)

(52) U.S. Cl.
CPC ...... *B29C 47/0057* (2013.01); *B29C 47/0004* (2013.01); *B29C 47/0026* (2013.01); *B29C 47/065* (2013.01); *B32B 25/16* (2013.01); *B32B 27/306* (2013.01); *B32B 27/308* (2013.01); *B32B 27/32* (2013.01); *B29K 2023/0625* (2013.01); *B29K 2025/06* (2013.01); *B29K 2105/0085* (2013.01); *B29K 2105/0088* (2013.01); *B29K 2105/0094* (2013.01); *B29K 2105/02* (2013.01); *B29K 2995/0022* (2013.01); *B29K 2995/0029* (2013.01); *B29K 2995/0063* (2013.01); *B29K 2995/0082* (2013.01); *B29K 2995/0088* (2013.01); *B29K 2995/0097* (2013.01); *B29L 2009/00* (2013.01); *B29L 2031/744* (2013.01); *B32B 2250/03* (2013.01); *B32B 2250/04* (2013.01); *B32B 2250/05* (2013.01); *B32B 2250/24* (2013.01); *B32B 2270/00* (2013.01); *B32B 2307/736* (2013.01); *B32B 2519/00* (2013.01);

(Continued)

(58) Field of Classification Search
None
See application file for complete search history.

(56) References Cited

U.S. PATENT DOCUMENTS

| 4,735,931 A | 4/1988 | McDaniel et al. |
| 4,820,785 A | 4/1989 | McDaniel et al. |

(Continued)

FOREIGN PATENT DOCUMENTS

EP    0533154    3/1993

OTHER PUBLICATIONS

Modern Plastics Encyclopedia '96, Mid-Nov. 1995 Issue, vol. 72, No. 12, 3 pages.

(Continued)

*Primary Examiner* — Monica Huson
(74) *Attorney, Agent, or Firm* — Merchant & Gould P.C.

(57) ABSTRACT

The present invention discloses multilayer blown films for shrink label and related applications. These multilayer blown films can comprise a core layer containing an ethylene polymer, and inner and outer layers containing conjugated diene monovinylarene block copolymers.

20 Claims, 8 Drawing Sheets

(51) Int. Cl.

| | | |
|---|---|---|
| *B29K 23/00* | (2006.01) | |
| *B29K 25/00* | (2006.01) | |
| *B29K 105/00* | (2006.01) | |
| *B29K 105/02* | (2006.01) | |
| *B29L 9/00* | (2006.01) | |
| *B29L 31/00* | (2006.01) | |

(52) U.S. Cl.
CPC .. *Y10T 428/1352* (2015.01); *Y10T 428/31504* (2015.04); *Y10T 428/31913* (2015.04)

(56) References Cited

U.S. PATENT DOCUMENTS

| | | |
|---|---|---|
| 4,966,951 A | 10/1990 | Benham et al. |
| 5,115,068 A | 5/1992 | Bailey et al. |
| 5,158,836 A | 10/1992 | Schirmer et al. |
| 5,208,309 A | 5/1993 | McDaniel et al. |
| 5,219,666 A | 6/1993 | Schirmer et al. |
| 6,096,828 A | 8/2000 | Deporter et al. |
| 6,420,486 B1 | 7/2002 | DePorter et al. |
| 6,444,755 B1 | 9/2002 | DePorter et al. |
| 6,783,864 B2 | 8/2004 | Hamulski |
| 6,835,462 B2 | 12/2004 | Sun et al. |
| 6,835,778 B2 | 12/2004 | Swisher et al. |
| 7,037,980 B2 | 5/2006 | Stacy et al. |
| 7,135,234 B2 | 11/2006 | Donnelly et al. |
| 7,193,014 B2 | 3/2007 | Wilkey et al. |
| 7,351,767 B2 | 4/2008 | Hartsock et al. |
| 7,473,473 B2 | 1/2009 | Verrocchi |
| 7,737,216 B2 | 6/2010 | Brown et al. |
| 8,092,920 B2 | 1/2012 | Saavedra et al. |
| 8,415,429 B2 | 4/2013 | Brown et al. |
| 8,933,171 B2 | 1/2015 | Pettey et al. |
| 9,040,628 B2 | 5/2015 | Brown et al. |
| 9,174,377 B2 | 11/2015 | Pettey et al. |
| 9,469,752 B2 | 10/2016 | Pettey et al. |
| 9,550,869 B2 | 1/2017 | Brown et al. |
| 2003/0113535 A1 | 6/2003 | Sun et al. |
| 2005/0106342 A1 | 5/2005 | Dawes et al. |
| 2005/0166551 A1 | 8/2005 | Keane et al. |
| 2006/0057410 A1 | 3/2006 | Saavedra et al. |
| 2006/0089457 A1 | 4/2006 | Hartsock et al. |
| 2007/0173605 A1 | 7/2007 | Brown et al. |
| 2008/0134642 A1 | 6/2008 | Brown et al. |
| 2009/0220757 A1 | 9/2009 | Patel et al. |
| 2012/0288651 A1 | 11/2012 | Pettey et al. |

OTHER PUBLICATIONS

Film Extrusion Manual—*Process, Materials, Properties*, TAPPI Press, 1992, pp. ix-xxiii.
INEOS Styrenics, Product Data Sheet, Specialty High Gloss Impact Polystyrene 7800, 2 pages.
Non-final Office Action cited in U.S. Appl. No. 10/527,142 dated Mar. 17, 2011, 7 pages.
ICIS.com, "Phillips launches new low density linear PEs," Jun. 1994, 2 pages.
Film & Extrusion Coating Products, "Our broadest, most versatile line of Film & Extrusion Coating products ever offered," Chevron Phillips Chemical Company LP, 2009, 4 pages.
K•RESIN Styrene-Butadiene Copolymers, KR52 K-Resin®Styrene-Butadiene Copolymers (SBC), Feb. 2011, pp. 1-2.
K•Resin Styrene-Butadiene Copolymers, KR53 K-Resin®Styrene-Butadiene Copolymers (SBC), Feb. 2011, p. 1.
MarFlex Polyethylene, MarFlex®HHM TR-258: Low Density Linear Polyethylene, Sep. 2010, pp. 1-2.
The Film & Coating Connection "Spreading the News," Chevron Phillips Chemical Company LP, Dec. 2010, Issue #15, pp. 1-4.
Film & Extrusion Coating Products, Chevron Phillips Chemical Company LP, Fall 2010, 4 pages.
PowerPoint Presentation entitled, "Improving Multi-Layer LDPE and LLDPE Films Using Styrene Block Copolymers," presented to the AMI Multilayer Packaging Films Conference on Jun. 15-16, 2010, sent to the AMI Conference Coordinator on May 14, 2010, 25 pages.

FIG. 1

| Multilayer Blown Film Structure |
| --- |
| Inner Layer |
| Core Layer |
| Outer Layer |

FIG. 2

| Multilayer Blown Film Structure |
| --- |
| Inner Layer |
| Core Layer |
| Miscellaneous Layer |
| Outer Layer |

FIG. 3

| Multilayer Blown Film Structure |
| --- |
| Inner Layer |
| Miscellaneous Layer |
| Core Layer |
| Miscellaneous Layer |
| Outer Layer |

FIG. 4

| Multilayer Blown Film Structure |
| --- |
| Inner Layer |
| Miscellaneous Layer |
| Miscellaneous Layer |
| Core Layer |
| Miscellaneous Layer |
| Miscellaneous Layer |
| Outer Layer |

MULTILAYER BLOWN FILMS FOR SHRINK APPLICATIONS

REFERENCE TO RELATED APPLICATION

This application is a divisional application of U.S. patent application Ser. No. 13/106,008, filed on May 12, 2011, now U.S. Pat. No. 9,174,377 the disclosure of which is incorporated herein by reference in its entirety.

BACKGROUND OF THE INVENTION

The present invention relates generally to multilayer blown films with desirable shrink characteristics. These multilayer blown films can be used in label applications, such as shrink sleeve labels and roll fed shrink labels.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Multilayer blown films disclosed and described herein can comprise three or more layers, and can be characterized by various shrink properties, for example, a MD shrink of greater than about 60%, and/or a CD shrink in a range from 0% to about 15%, and/or a MD:CD shrink ratio in a range from about 4:1 to about 30:1. These multilayer blown films can be produced using standard blown film processes, without any orientation processes involving tenter frame, double bubble, or machine direction orientation equipment.

For instance, an embodiment of this invention is directed to a multilayer blown film, and in this embodiment, the multilayer blown film can comprise (a) a core layer having a first side and a second side, (b) an inner layer positioned on the first side of the core layer, and (c) an outer layer positioned on the second side of the core layer. In this embodiment, the multilayer blown film can have a MD:CD shrink ratio in a range from about 4:1 to about 30:1 at 150° C., and/or a MD shrink of greater than about 60%, and/or a CD shrink in a range from 0% to about 15%.

Another embodiment of this invention also is directed to a multilayer blown film, and in this embodiment, the multilayer blown film can comprise (a) a core layer having a first side and a second side, the core layer comprising an ethylene polymer, (b) an inner layer positioned on the first side of the core layer, the inner layer comprising a first conjugated diene monovinylarene block copolymer, and (c) an outer layer positioned on the second side of the core layer, the outer layer comprising a second conjugated diene monovinylarene block copolymer. This multilayer blown film can have a MD:CD shrink ratio in a range from about 4:1 to about 30:1 at 150° C., and/or a MD shrink of greater than about 60%, and/or a CD shrink in a range from 0% to about 15%. Additionally, the ethylene polymer can have a MI in a range from about 0.01 to about 2 g/10 min, a ratio of HLMI/MI in a range from about 50 to about 300, and a ratio of Mw/Mn in a range from about 5 to about 30.

Embodiments of the invention also are directed to processes for producing multilayer blown films. One such process can comprise (i) introducing into a blown film coextrusion die: (a) a core layer flow having a first side and a second side, the core layer flow comprising an ethylene polymer, (b) an inner layer flow positioned on the first side of the core layer flow, the inner layer flow comprising a first conjugated diene monovinylarene block copolymer, and (c) an outer layer flow positioned on the second side of the core layer flow, the outer layer flow comprising a second conjugated diene monovinylarene block copolymer; and (ii) blowing a coextruded flow exiting the die at a blow-up ratio in a range from about 1.5 to about 4 to produce the multilayer blown film.

Both the foregoing, summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURES

FIG. 1 presents an illustration of a 3-layer blown film structure according to an embodiment of the present invention.

FIG. 2 presents an illustration of a 4-layer blown film structure according to an embodiment of the present invention.

FIG. 3 presents an illustration of a 5-layer blown films structure according to an embodiment of the present invention.

FIG. 4 presents an illustration of a 7-layer blown film structure according to an embodiment of the present invention.

DEFINITIONS

Figure 5:
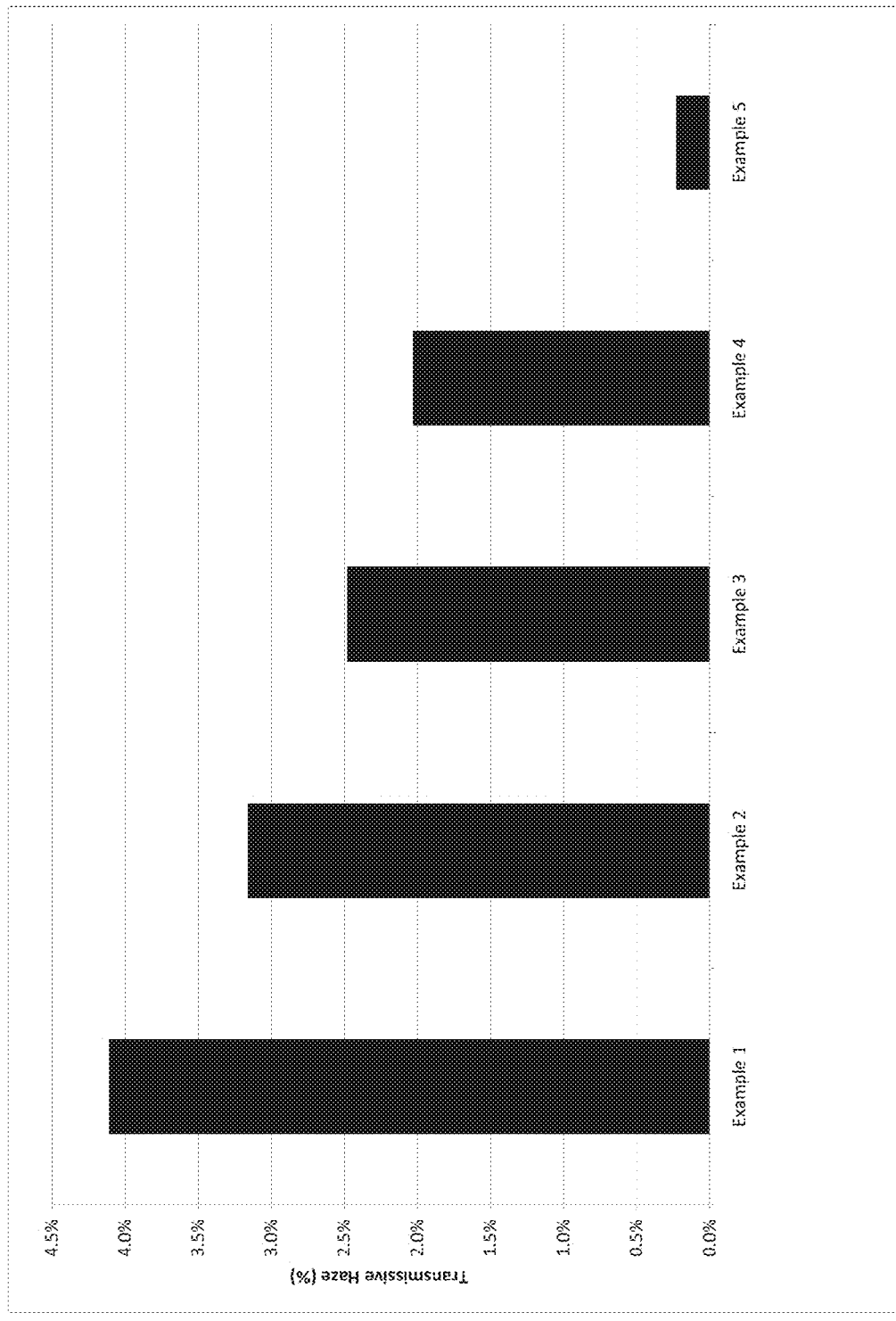
FIG. 5 presents a plot of the haze for the 3-layer blown films of Examples 1-5.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a layer consisting essentially of a polymer includes impurities and additives typically present in a commercially produced or commercially available sample of the recited polymer. Moreover, a layer consisting essentially of a polymer also includes any combination of additives (or masterbatches) commonly used by producers of blown film in combination with the impurities and additives typically present in a commercially produced or commercially available sample of the recited polymer. When a claim includes different features and/or feature classes (for example, a method step, composition features, and/or property features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a layer composition consisting of a specific polymer and other components; alternatively, consisting essentially of a specific polymer and other components; or alternatively, comprising a specific polymer and other components and other non-recited components.

Therefore, while compositions and methods are described in terms of "comprising" various components or steps, the compositions and methods can also "consist essentially of" or "consist of" the various components or steps, unless stated otherwise. For example, a core layer provided in an embodiment of the invention can comprise, or alternatively, consist essentially of or alternatively, consist of, an ethylene polymer.

The terms "a," "an," and "the" are intended to include plural alternatives, e.g., at least one. For instance, the disclosure of "a conjugated diene monovinylarene block copolymer," "an ethylene polymer," etc., is meant to encompass one, or mixtures or combinations of more than one conjugated diene monovinylarene block copolymer, ethylene polymer, etc., unless otherwise specified.

The term "polymer" is used herein generically to include homopolymers, copolymers, terpolymers, and so forth. A copolymer is derived from a monomer and one comonomer, while a terpolymer is derived from a monomer and two comonomers. Accordingly, "polymer" encompasses copolymers, terpolymers, etc., derived from any monomer and comonomer(s) disclosed herein. Similarly, an ethylene polymer would include ethylene homopolymers, ethylene copolymers, ethylene terpolymers, and the like. As an example, an ethylene polymer can be derived from ethylene and one or more comonomers, such as 1-butene, 1-hexene, or 1-octene. If the monomer and comonomer were ethylene and 1-hexene, respectively, the resulting polymer would be categorized an as ethylene1-hexene copolymer.

In like manner, the scope of the term "polymerization" includes homopolymerization, copolymerization, terpolymerization, etc. Therefore, a copolymerization process would involve contacting one olefin monomer (e.g., ethylene) and one olefin comonomer (e.g., 1-hexene) to produce a copolymer.

As used herein, a "conjugated diene" refers to an organic compound containing conjugated carbon-carbon double bonds and a total of 4 to 12 carbon atoms, such as 4 to 8 carbon atoms. Exemplary conjugated dienes can include, but are not limited to, 1,3-butadiene, 2-methyl-1,3-butadiene, 2-ethyl-1,3-butadiene, 2,3-dimethyl-1,3-butadiene, pentadiene, 3-butyl-1,3-octadiene, and mixtures thereof. For example, in some embodiments disclosed herein, the conjugated diene can be 1,3-butadiene. A unit of a polymer, wherein the unit is derived from polymerization of a conjugate diene monomer, is a "conjugated diene unit."

As used herein, "monovinylarene" refers to an organic compound containing a single carbon-carbon double bond, at least one aromatic moiety, and a total of 8 to 18 carbon atoms, such as 8 to 12 carbon atoms. Exemplary monovinylarenes can include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. For example, in some embodiments disclosed herein, the monovinylarene can be styrene. A unit of a polymer, wherein the unit is derived from polymerization of a monovinylarene monomer, is a "monovinylarene unit."

A "conjugated diene monovinylarene block copolymer" is a polymer comprising monovinylarene units and conjugated diene units. The polymer comprises one or more blocks, wherein each block comprises monovinylarene units and/or conjugated diene units. Any particular block can comprise either or both monovinylarene units or conjugated diene units. If it comprises only one type of unit, it can be termed a "monoblock," If it comprises both, it can be termed a mixed block. Exemplary mixed blocks can include, but are not limited to, random blocks, tapered blocks, stepwise blocks, or any other type of mixed block.

A mixed block is "tapered" when both (a) the mole fraction of conjugated diene units in a first section of the block is higher than the mole fraction of conjugated diene units in a second section of the block, wherein the second section of the block is closer to a given end of the block, and (b) condition (a) is true for substantially all sections of the block. Depending on the size of the sections being considered, condition (a) may not be true for all sections, but if so, will be not true at no more than about the level expected by chance.

A mixed block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

Although any methods and materials similar or equivalent to those described herein can be used in the practice or testing of the invention, the typical methods and materials are herein described.

All publications and patents mentioned herein are incorporated herein, in their entirety, by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. A representative example follows for the MD:CD shrink ratio of a multilayer blown film in an embodiment of this invention. For example, by a disclosure that the multilayer blown film has a MD:CD shrink ratio in a range from about 4:1 to about 30:1, Applicants intend to recite that the ratio can be about 4:1, about 5:1, about 6:1, about 7:1, about 8:1, about 9:1, about 10:1, about 11:1, about 12:1, about 13:1, about 14:1, about 15:1, about 16:1, about 17:1, about 18:1, about 19:1, about 20:1, about 21:1, about 22:1, about 23:1, about 24:1, about 25:1, about 26:1, about 27:1, about 28:1, about 29:1, or about 30:1. Additionally, the MD:CD shrink ratio can be within any range from about 4:1 to about 30:1 (for example, the ratio is in a range from about 12:1 to about 20:1), and this also includes any combination of ranges between about 4:1 and about 30:1. Likewise, all other ranges disclosed herein should be interpreted in a manner similar to this representative example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

As used herein, "MD" refers to machine direction, and "CD" refers to cross direction. The cross direction also can be referred to herein as the transverse direction (TD).

Various physical properties of multilayer blown films, as well as of the polymeric components that are used to form these films, are discussed throughout this disclosure. Following is a listing of physical properties and their corresponding analytical test procedures and conditions:

Melt index (MI), ASTM D1238 Revision Feb. 1, 2010, g/10 min, 190° C., 2.16 Kg weight.
High Load Melt Index (HLMI), ASTM D1238 Revision Feb. 1, 2010, g/10 min, 190° C., 21.6 Kg weight.
Melt Flow Rate (MFR), ASTM D1238 Revision Feb. 1, 2010, g/10 min, 200° C., 5 Kg weight.
Density, ethylene polymers, ASTM D1505 Revision Jul. 1, 2010, g/cm$^3$.
Density, styrenic polymers, ASTM D792 Revision Jun. 15, 2008, g/cm$^3$.
Shrink, oil bath, ASTM D2732 Revision Nov. 1, 2008, %, 150° C.
Shrink tension, ASTM D2838 Revision May 1, 2009, Pa, 150° C.
Haze, ASTM D1003 Revision Nov. 1, 2007, %.
60° Gloss, ASTM D523 Revision Jun. 1, 2008, %.
1% Secant Modulus, ASTM D882 Revision Apr. 1, 2010, psi.
Tensile Strength at Break, ASTM D882 Revision Apr. 1, 2010, psi.
Vicat Softening Point, ASTM D1525 Revision Nov. 15, 2009, ° C.
Dart Impact, ASTM D1709 Revision May 1, 2009, g, 26 inch drop height, varying dart weight to break.

DETAILED DESCRIPTION OF THE INVENTION

The present disclosure provides for multilayer blown films comprising three or more layers, and these films can have a MD shrink of greater than about 60% and a CD shrink in a range from 0% to about 15%. Such shrink characteristics can be achieved using a standard blown film process, without the added expense and complexity of orientation processes such as tenter frame, double bubble, machine direction orientation (MDO), and the like.

Multilayer Blown Films

Embodiments of this invention are directed to multilayer blown films comprising (a) a core layer having a first side and a second side; (b) an inner layer positioned on the first side of the core layer; and (c) an outer layer positioned on the second side of the core layer. In some embodiments, the multilayer blown film can have the three layers as described generally as an inner layer, a core layer, and an outer layer, while in other embodiments, the multilayer blown film can have four or more layers. Thus, the core layer is not limited only to a middle layer in between an inner layer and the outer layer, i.e., other layers can be present. The inner layer and the outer layer are described as being positioned on a first and a second side, respectively, of the core layer. An additional layer, or layers, can be between the core layer and the inner layer, and likewise, between the core layer and the outer layer.

Various combinations of layers can be employed in the formation of the multilayer blown films in accordance with embodiments of this invention. FIGS. 1-4, respectively, illustrate representative 3-layer, 4-layer, 5-layer, and 7-layer blown film structures. These and other non-limiting layer configurations follow below, in which letters are used to represent the film layers: I/C/O, I/M/C/O, I/C/M/O, I/M/M/C/O, I/M/C/M/O, I/C/M/M/O, I/M/M/C/M/O, I/M/C/M/M/O, I/M/M/M/C/O, I/M/M/C/M/M/O, I/M/M/M/C/M/O, and I/M/C/M/M/M/O. In these examples, "C" represents a core layer, "I" represents an inner layer, "O" represents an outer layer, and "M" represents a miscellaneous or intermediate layer. Layers which are next to each other are described as being affixed to or adjacent to each other. For instance, in the multilayer structure I/M/C/O, the "O" layer is adjacent to or affixed to the second side of the "C" layer, and the "O" layer is also positioned on the second side of the "C" layer. Likewise, the "I" layer is not adjacent to nor affixed to the first side of the "C" layer, but is positioned on the first side of the "C" layer. Hence, by referring to a given layer as positioned on a side of the core layer, the given layer can be adjacent to or affixed to the core layer, or an additional layer or layers (for example, "M") can be between the given layer and the core layer. There is no upper limit on the total number of layers in a multilayer blown film in accordance with this invention, for instance, 7-layer and 9-layer structures, provided that the inner layer, core layer, and outer layer are present within the multilayer blown film structure. Materials which can be used in the inner layer, core layer, outer layer, and miscellaneous layer(s) are described herein below, and may be utilized in any combination without limitation to further describe the multilayer blown film structure.

FIG. 1 illustrates a 3-layer blown film with an I/C/O layer configuration. Specifically, in this multilayer blown film, the inner layer is adjacent the first side of the core layer, and the outer layer is adjacent the second side of the core layer. As described above and illustrated in FIGS. 2-4, multilayer blown films contemplated herein can have four or more layers, e.g., the multilayer blown film can have five layers or seven layers. Accordingly, a miscellaneous or intermediate layer (or layers) can be between the inner layer and the core layer and/or between the outer layer and the core layer.

Multilayer blown films described herein are not limited to any particular film thickness range, however, multilayer blown films useful in many end-use applications generally have an average film thickness in a range from about 0.5 mils to about 10 mils, wherein a mil is equal to 1/1000 of an inch, or 0.025 mm. In certain embodiments, the average film thickness can be in a range from about 0.5 to about 5 mils, from about 0.75 to about 4 mils, from about 1 to about 3 mils, or from about 1 to about 2 mils. The core layer of the multilayer blown film can comprise, on average, from about 40% to about 85% of the total film thickness in some embodiments, while the core layer can comprise, on average, from about 50% to about 85%, or from about 60% to about 80%, of the total film thickness in other embodiments. Likewise, the outer layer and the inner layer of the multilayer blown film, independently, can comprise, on average, from about 8% to about 25% of the total film thickness; alternatively, from about 10% to about 25%; or alternatively, from about 10% to about 20%. Totals of these layer percentages of the inner layer, core layer, and outer layer do not exceed 100%, but in instances where the total is less than 100%, the remaining thickness can come from one or more miscellaneous layers, which can comprise the same or different polymer (or same or different blend of polymers). For example, an illustrative multilayer blown film can have a 70% core layer, a 15% inner layer, and a 15% outer layer. As another example, an illustrative multilayer blown film can have a 60% core layer, a 10% inner layer, a 15% outer layer, and a 15% miscellaneous layer between the inner layer and the core layer.

Multilayer blown films in accordance with the present invention can have a beneficial combination of MD and CD shrink properties. For instance, in one embodiment, the MD:CD shrink ratio of the multilayer blown film at 150° C. can be in a range from about 4:1 to about 100:1, from about 4:1 to about 50:1, or from about 4:1 to about 30:1. In another embodiment, the muitilayer blown film can be characterized as having a MD:CD shrink ratio in a range from about 5:1 to about 30:1, from about 8:1 to about 26:1, from about 10:1 to about 25:1, from about 12:1 to about 20:1, or from about 14:1 to about 18:1.

Additionally or alternatively, the MD shrink of the multilayer blown film can be greater than about 60% and/or the CD shrink of the multilayer blown film can be in a range from 0% to about 15%. Applicants contemplate that the MD shrink can be greater than about 65%, or greater than about 70%, in one embodiment, while in another embodiment, the MD shrink can be in a range from about 60% to about 95%, from about 65% to about 90%, from about 70% to about 85%, or from about 75% to about 85%. Typical ranges for the CD shrink of the multilayer blown film can include, but are not limited to, from about 1% to about 15%, from about 1 to about 12%, from 0% to about 10%, from about 1% to about 10% from about 2% to about 8%, from about 2% to about 4%, or from about 1% to about 5%.

Generally, the multilayer blown film can have a MD and/or CD shrink tension at 150° C. in a range from about 50,000 to about 300,000 Pa. For example, the MD shrink tension can be in a range from about 75,000 to about 275,000 Pa, from about 100,000 Pa to about 275,000 Pa, or from about 125,000 Pa to about 250,000 Pa. Similarly, the CD shrink tension can be in a range from about 50,000 to about 250,000 Pa, from about 50,000 Pa to about 200,000 Pa, or from about 60,000 Pa to about 150,000 Pa.

Multilayer blown films described herein can have optical properties, such as low haze and high gloss, which can provide beneficial aesthetic or visual impact properties in certain end-use applications. In an embodiment, the haze of the multilayer blown film can be less than about 10%; alternatively, less than about 8%; alternatively, less than about 6%; alternatively, in a range from about 0.5% to about 8%; alternatively, in a range from about 0.5% to about 5%; or alternatively, in a range from about 1% to about 3%. Additionally or alternatively, the multilayer blown film can have a 60° gloss of greater than about 100%; alternatively, greater than about 125%; or alternatively, greater than about 140%.

Secant modulus often can be used as a measurement of the relative stiffness of a film, and in some end-use applications, it can be beneficial for the film to have greater stiffness, e.g., a higher secant modulus, to give the film a stiff or crisp feel. Multilayer blown films described herein generally can have a MD and/or CD 1% secant modulus of greater than about 50,000 psi. For example, the MD and/or CD 1% secant modulus can be greater than about 55,000 psi, greater than about 60,000 psi, in range from about 50,000 psi to about 200,000 psi, or in a range from about 50,000 psi to about 150,000 psi.

Multilayer blown films disclosed herein can have one or more of the various film thickness, layer configuration, layer ratio, MD shrink, CD shrink, shrink tension, haze, gloss, and/or 1% secant modulus properties as disclosed above. Moreover, in one embodiment, the multilayer blown film can comprise (a) a core layer having a first side and a second side, the core layer comprising an ethylene polymer; (b) an inner layer positioned on the first side of the core layer, the inner layer comprising a first stryene/butadiene copolymer; and (c) outer layer positioned on the second side of the core layer, the outer layer comprising a second styrene/butadiene copolymer. In this embodiment, the first styrene/butadiene copolymer and the second styrene/butadiene copolymer can comprise the same polymer or the same blend of polymers, or alternatively, the first stryene/butadiene copolymer and the second stryene/butadiene copolymer can comprise different polymers or a different blend of polymers. In another embodiment, the multilayer blown film can comprise (a) a core layer having a first side and a second side, the core layer comprising an ethylene polymer; (b) inner layer positioned on the first side of the core layer, the inner layer comprising a first conjugated diene monovinylarene block copolymer; and (c) an outer layer positioned on the second side of the core layer, the outer layer comprising a second conjugated diene monovinylarene block copolymer. In this embodiment, the first conjugated diene monovinylarene block copolymer and the second conjugated diene monovinylarene block copolymer can comprise the same polymer or the same blend of polymers, or alternatively, the first conjugated diene monovinylarene block copolymer and the second conjugated diene monovinylarene block copolymer can comprise different polymers or a different blend of polymers. In yet another embodiment, the multilayer blown film can comprise (a) a core layer having a first side and a second side, the core layer comprising an ethylene polymer; (b) an inner layer positioned on the first side of the core layer, the inner layer comprising a first coupled multimodal conjugated diene monovinylarene block copolymer; and (c) an outer layer positioned on the second side of the core layer, the outer layer comprising a second coupled multimodal conjugated diene monovinylarene block copolymer. In this embodiment, the first coupled multimodal conjugated diene monovinylarene block copolymer and the second coupled multimodal conjugated diene monovinylarene block copolymer can comprise the same polymer or the same blend of polymers, or alternatively, the first coupled multimodal conjugated diene monovinylarene block copolymer and the second coupled multimodal conjugated diene monovinylarene block copolymer can comprise different polymers or a different blend of polymers.

Core Layer

In an embodiment of this invention, a multilayer blown film can comprise (a) a core layer having a first side and a second side; (b) an inner layer positioned on the first side of the core layer; and (c) an outer layer positioned on the second side of the core layer, wherein the multilayer blown film has a MD:CD shrink ratio in a range of from about 4:1 to about 30:1, and/or a MD shrink of greater than about 60%, and/or a CD shrink in a range from 0% to about 15%. Additionally or alternatively, a multilayer blown film can comprise (a) a core layer having a first side and a second side, the core layer comprising an ethylene polymer; (b) an inner layer positioned on the first side of the core layer, the inner layer comprising a first conjugated diene monovinylarene block copolymer (or a first coupled multimodal conjugated diene monovinylarene block copolymer, or a first stryene/butadiene copolymer, etc.); and (c) an outer layer positioned on the second side of the core layer, the outer layer comprising a second conjugated diene monovinylarene block copolymer (or a second coupled multimodal conjugated diene monovinylarene block copolymer, or a second stryene/butadiene copolymer, etc.).

In one embodiment, the ethylene polymer can comprise a very low density polyethylene (VLDPE), a linear low density polyethylene (LLDPE), a low density linear polyethylene (LDLPE), a high density polyethylene (HDPE), or a low density polyethylene (LDPE), and this can include any blend or combination thereof. Accordingly, blends or combinations of more than one ethylene polymer, as well as blends or combinations of an ethylene polymer with another polymer, can be employed. In another embodiment, the ethylene polymer can comprise a very low density polyethylene (VLDPE), a linear low density polyethylene (LLDPE), a low density linear polyethylene (LDLPE), or a high density polyethylene (HDPE), including blends or combinations thereof. In yet another embodiment, the ethylene polymer can comprise a very low density polyethylene (VLDPE); alternatively, a linear low density polyethylene (LLDPE); alternatively, a low density linear polyethylene (LDLPE); or alternatively, a high density polyethylene (HDPE). In these and other embodiments, the core layer can further comprise another polymer including, but not limited to, a polypropylene homopolymer, a polypropylene random copolymer, an impact polypropylene, an ethylene vinyl acetate copolymer, or an ethylene acrylic acid copolymer, and the like, and including combinations thereof.

Suitable ethylene polymers are not limited to any particular polymerization process and reactor system and/or any particular catalyst system. For example, the polymerization reactor system used to produce the ethylene polymer can comprise a slurry reactor, a gas-phase reactor, a solution reactor, or various combinations thereof (e.g., including dual reactor systems). The catalyst system used to produce the ethylene polymer can be a chromium-based catalyst system, a Ziegler-Natta based catalyst system, a metallocene-based catalyst system, or combinations thereof, and the catalyst system can comprise one or more transition metals, such as chromium, vanadium, titanium, zirconium, hafnium, and the like, or combinations thereof. Hence, all traditional LLDPE polymers are encompassed herein, as well as all metallocene-catalyzed LLDPE (mLLDPE) resins.

Generally, HDPE resins have a density range of greater than about 0.945 g/cm$^3$, and VLDPE resins of below about 0.915 g/cm$^3$, with LLDPE spanning between, although there can be, and often is, overlap. A LDLPE resin can be described as a LLDPE resin with generally broader molecular weight distribution, greater melt strength, and better bubble stability than either conventional LLDPE or mLLDPE. Moreover, the LDLPE often can have a fractional melt index, e.g., less than 1. While not being limited thereto, certain suitable LDLPE polymers that can be employed in the core layer of a multilayer blown film are described in U.S. Pat. Nos. 4,735,931, 4,820,785, 4,966,951, 5,115,068, and 5,208,309, the disclosures of which are incorporated herein by reference in their entirety. Illustrative examples of LDLPE polymers can include, but are not limited to, MarFlex® TR-257 and MarFlex® TR-258 polyethylenes, available from Chevron Phillips Chemical Company LP.

In some embodiments, the ethylene polymer can be an ethylene homopolymer, while in other embodiments, the ethylene polymer can be an ethylene copolymer or terpolymer. In the latter case, suitable comonomers can include, but are not limited to, propylene, 1-butene. 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, and the like, or combinations thereof. Often, the comonomer can comprise an α-olefin, such as 1-butene, 1-hexene, 1-octene, or a combination thereof.

Ethylene polymers that can be employed in the core layer of the multilayer blown films disclosed herein generally can have a melt index (MI) in a range from about 0.01 to about 2 g/10 min. Melt indices in the range from about 0.02 to about 1.5 g/10 min, from about 0.05 to about 1 g/10 min, or from about 0.07 to about 0.8 g/10 min, are contemplated in some embodiments of this invention. For example, an ethylene polymer useful in the present invention can have a MI in the range from about 0.09 to about 0.6 g/10 min, from about 0.1 to about 0.5 g/10 min, or from about 0.1 to about 0.3 g/10 min.

The ratio of HLMI/MI is often referred to as a melt flow ratio. An ethylene polymer used herein often can have a HLMI/MI ratio in a range from about 50 to about 300, such as, for instance, from about 50 to about 200, from about 50 to about 150, from about 60 to about 140, from about 70 to about 130, from about 70 to about 120, or from about 75 to about 110.

An ethylene polymer within the scope of the present invention generally can have a weight-average molecular weight (Mw) in a range from about 75,000 to about 500,000 g/mol. In some embodiments, the Mw of the ethylene polymer can be in range from about 90,000 to about 350,000 g/mol, while in other embodiments, the Mw of the ethylene polymer can be in a range from about 100,000 to about 250,000 g/mol, from about 110,000 to about 210,000 g/mol, or from about 120,000 to about 200,000 g/mol. Molecular weights and molecular weight distributions for the ethylene polymers disclosed herein can be obtained using a PL 220 SEC high temperature chromatography unit (Polymer Laboratories) with trichlorobenzene (TCB) as the solvent, with a flow rate of 1 mL/minute at a temperature of 145° C. BHT (6-di-tert-butyl-4-methylphenol) at a concentration of 0.5 g/L can be used as a stabilizer in the TCB. An injection volume of 200 μL can be used with a nominal polymer concentration of 1.5 mg/mL. Dissolution of the sample in stabilized TCB can be carried out by heating at 150° C. for 5 hours with occasional, gentle agitation. The columns used can be three PLgel Mixed A LS columns (7.8×300 mm) and can be calibrated with a broad linear polyethylene standard (Phillips Marlex® BHB 5003) for which the molecular weight has been determined.

The ratio of Mw/Mn (weight-average to number-average molecular weight ratio, or polydispersity index, or heterogeneity index) for the ethylene polymers disclosed herein often can be in a range from about 3 to about 50. In some embodiments, the Mw/Mn ratio can be in a range from about 4 to about 40. Specifically contemplated ranges for the ratio of Mw/Mn encompassed by the present invention can include, but are not limited to, from about 5 to about 30, from about 5 to about 25, from about 5 to about 20, from about 6 to about 20, from about 6 to about 18, from about 6 to about 16, from about 6 to about 13, from about 8 to about 16, from about 7 to about 15, from about 9 to about 15, from about 7 to about 13, from about 8 to about 14, or from 9 to about 13.

In an embodiment, the density of the ethylene polymer typically can fall within the range from about 0.88 to about 0.96 g/cm$^3$, or from about 0.88 to about 0.94 g/cm$^3$. In another embodiment, the ethylene polymer density can be in a range from about 0.895 to about 0.93 g/cm$^3$, or from about 0.90 to about 0.93 g/cm$^3$. Yet, in another embodiment, the density can be in a range from about 0.915 to about 0.935 g/cm$^3$, from about 0.919 to about 0.935 g/cm$^3$, from about 0.92 to about 0.929 g/cm$^3$, or from about 0.921 to about 0.925 g/cm$^3$.

Inner and Outer Layers

In an embodiment of this invention, a multilayer blown film can comprise (a) a core layer having a first side and a second side; (b) an inner layer positioned on the first side of the core layer; and (c) an outer layer positioned on the second side of the core layer, wherein the multilayer blown film has a MD:CD shrink ratio in a range of from about 4:1 to about 30:1, and/or a MD shrink of greater than about 60%, and/or a CD shrink in a range from 0% to about 15%. Additionally or alternatively, the multilayer blown film can comprise (a) a core layer having a first side and a second side, the core layer comprising an ethylene polymer; (b) an inner layer positioned on the first side of the core layer, the inner layer comprising a first conjugated diene monovinylarene block copolymer (or a first coupled multimodal conjugated diene monovinylarene block copolymer, or a first stryene/butadiene copolymer, etc.); and (c) an outer layer positioned on the second side of the core layer, the outer layer comprising a second conjugated diene monovinylarene block copolymer (or a second coupled multimodal conjugated diene monovinylarene block copolymer, or a second stryene/butadiene copolymer, etc.). In these and other embodiments, the inner layer and the outer layer can comprise the same polymer or the same blend of polymers (e.g., the first conjugated diene monovinylarene block copolymer and the second conjugated diene monovinylarene block copolymer can be the same), or alternatively, the inner layer and the outer layer can comprise different polymers or a different blend of polymers (e.g., the first conjugated diene monovinylarene block copolymer and the second conjugated diene monovinylarene block copolymer can be different). In further embodiments, the inner layer and/or the outer layer can provide a surface capable of surface printing and/or reverse printing, a surface providing good printability, a surface with adequate surface energy (e.g., dyne level) retention for various printing ink types/systems, etc.

While not being limited thereto, certain suitable conjugated diene monovinylarene block copolymers that can be employed in the inner layer and/or the outer layer of a multilayer blown film are described in U.S. Pat. Nos. 6,096,828, 6,420,486, 6,444,755, 6,835,778, 7,037,980, and 7,193,014, the disclosures of which are incorporated herein by reference in their entirety; and U.S. Patent Publication Nos. 2006/0089457, 2007/0173605, and 2008/0134642, the disclosures of which are incorporated herein by reference in their entirety. Illustrative examples of conjugated diene monovinylarene block copolymers can include, but are not limited to, K-Resin® SEC, available from Chevron Phillips Chemical Company LP, and grades such as, for instance, DK11, KR52, or KR53, all available from Chevron Phillips Chemical Company LP The relative amount of conjugated diene and monovinylarene in a block copolymer can vary broadly depending on the particular characteristics desired. Generally, the conjugated diene/monovinylarene block copolymer can contain monovinylarene monomer in an amount in the range of from about 55 weight percent to about 95 weight percent, based on the total weight of the final block copolymer; alternatively, in the range of from about 60 weight percent to about 95 weight percent; or alternatively, in the range of from 65 weight percent to 90 weight percent.

Likewise, the conjugated diene monomer can be present in the final block copolymer in an amount in the range of from about 45 weight percent to about 5 weight percent, based on the total weight of the final block copolymer; alternatively, in the range of from about 40 weight percent to about 5 weight percent; or alternatively, in the range of from about 35 weight percent to about 10 weight percent.

In one embodiment of the present invention, the inner layer and/or the outer layer independently can comprise a conjugated diene monovinylarene block copolymer, while in another embodiment, the inner layer and/or the outer layer independently can comprise a coupled conjugated diene monovinylarene block copolymer, and in yet another embodiment, the inner layer and/or the outer layer independently can comprise a coupled multimodal conjugated diene monovinylarene block copolymer, in these and other embodiments contemplated herein, the block copolymer can comprise mixed conjugated diene/monovinylarene blocks selected from random blocks, tapered blocks, or combinations thereof. In another embodiment, the block copolymer can comprise at least three consecutive conjugated diene/monovinylarene mixed blocks. In an embodiment, the block copolymer can comprise at least three consecutive tapered blocks. In an embodiment, the block copolymer can comprise at least three consecutive random blocks. In yet another embodiment, the block copolymer can comprise at least four blocks of conjugated diene, monovinylarene, or mixed conjugated diene/monovinylarene blocks. In yet another embodiment, the block copolymer can comprise at least five blocks of conjugated diene, monovinylarene, or mixed conjugated diene/monovinylarene blocks. And, in still another embodiment, the block copolymer can comprise from about 55 weight percent to about 90 weight percent monovinylarene residues; alternatively, from about 65 weight percent to about 85 weight percent; or alternatively, from about 71 weight percent to about 79 weight percent. In these and other embodiments, the monovinylarene can contain from 8 to 18 carbon atoms (e.g., styrene), and the conjugated diene can contain from 4 to 12 carbon atoms (e.g., butadiene).

In accordance with some embodiments of this invention, the block copolymer can be produced by coupling at least two different living polymer chains having been produced by at least two separate charges of initiator. In other embodiments, the block copolymer can comprise a plurality of mixed conjugated diene/monovinylarene blocks, wherein each mixed conjugated diene/monovinylarene block can contain conjugated diene units and monovinylarene units with a weight ratio of conjugated diene units to monovinylarene units in a range from about 0.05 to about 0.33, from about 0.6 to about 0.28, or from about 0.08 to about 0.26.

The inner layer and/or outer layer of the multilayer blown film independently can comprise a block copolymer, as described above, but is not limited thereto. For instance, blends of various polymers can be made with the block copolymer. Therefore, the inner layer and/or the outer layer independently can further comprise a general purpose polystyrene, a high impact polystyrene, acyclic olefin copolymer, a styrene isoprene styrene copolymer, or a styrene ethylene-butylene styrene polymer, as well as blends or combinations thereof. Weight percentages of the additional polymer(s) can be, for example, up to about 10%, up to about 20%, up to about 30%, up to about 40%, up to about 50%, or up to about 60%, based on the total weight of inner layer and/or outer layer. In an embodiment, the inner layer and/or the outer layer independently can comprise a block copolymer (e.g., a conjugated diene monovinylarene block copolytner) and a general purpose polystyrene; alternatively, a conjugated diene monovinylarene block copolymer and a high impact polystyrene; alternatively, a conjugated diene monovinylarene block copolymer and a cyclic olefin copolymer (e.g., an ethylene-norbornene copolymer); alternatively, a conjugated diene monovinylarene block copolymer and a styrene isoprene styrene copolymer; or alternatively, a conjugated diene monovinylarene block copolymer and a styrene ethylene-butylene styrene polymer.

In some embodiments, the inner layer and/or the outer layer independently can comprise a K-Resin® SBC, available from Chevron Phillips Chemical Company LP, such as, for instance, DK11 (7.5 g/10 min MFR), KR52 (9 g/10 min MFR), or KR53 (10 g/10 min MFR), and the like, or any combination thereof. Accordingly, the inner layer and/or the outer layer independently can comprise DK11; alternatively, can comprise KR52; or alternatively, can comprise KR53. And, such inner layer and/or outer layer independently can further comprise a general purpose polystyrene, a high impact polystyrene, a cyclic olefin copolymer, a styrene isoprene styrene copolymer, or a styrene ethylene-butylene styrene polymer, and including blends or combinations thereof.

Block copolymers that can be employed in the inner layer and/or the outer layer of the multilayer blown films disclosed herein generally can have a melt flow rate (MFR) in a range from about 0.5 to about 30 g/10 min. MFR's in the range from about 1 to about 25 g/10 min, from about 1 to about 20 g/10 min, or from about 2 to about 18 g/10 min, are contemplated in some embodiments of this invention. For example, a block copolymer useful in the present invention can have a melt flow rate in a range from about 2 to about 15 g/10 min, from about 3 to about 15 g/10 min, or from about 5 to about 14 g/10 min.

Miscellaneous or Intermediate Layers

In some embodiments of this invention, the multilayer blown film can comprise a miscellaneous or intermediate layer. Any miscellaneous or intermediate layer (one, or more than one) that may be present in the multilayer blown film can comprise any of the polymers discussed above as being polymer options for the core layer, inner layer, and/or outer layer. Additional polymers that can be employed either singly or in combination in the miscellaneous or intermediate layer can include, but are not limited to, a polypropylene homopolymer, a polypropylene random copolymer, an impact polypropylene, an ethylene vinyl acetate copolymer (EVA), or an ethylene acrylic acid copolymer (EAA), and the like, or combinations thereof.

Moreover, in one embodiment, the miscellaneous or intermediate layer can be a tie layer, while in another embodiment, the miscellaneous or intermediate layer can be a layer comprising regrind. A tie layer can be used to promote adhesion between the inner layer and the core layer and/or between the outer layer and the core layer. Optionally, in some embodiments, a tie layer can be used, for example, comprising an EVA, typically with a vinyl acetate content over 6-9% by weight, or comprising an EAA, typically with an acrylic acid content of over 6-9% by weight.

In other embodiments, however, the multilayer blown film structure does not contain a tie layer between the inner layer and the core layer or between the outer layer and the core layer. In this embodiment, the interlayer bond strengths between the inner layer and the core layer and between the outer layer and the core layer are acceptable for the end-use application, and the addition of a tie layer merely adds cost and complexity.

Additives

Additives are often used in polymer films and formulations to improve the processing or ease of manufacturing of the polymer(s) and its intended finished article. Another use of additives is to impart a certain property or characteristic to the finished article. In embodiments of the present invention, one or more additives can be employed in the inner layer, and/or the outer layer, and/or the core layer, and/or any of the miscellaneous or intermediate layers that may be present. Suitable additives which can be employed in the blown film structures or formulations disclosed herein can include, but are not limited to, antioxidants, acid scavengers, antiblock additives, slip additives, colorants, fillers, polymer processing aids, UV inhibitors, and the like, including combinations thereof. Therefore, in certain embodiments, the multilayer blown film can comprise an additive selected from an antioxidant, an acid scavenger, an antiblock additive, a slip additive, a colorant, a tiller, a polymer processing aid, a UV inhibitor, and the like, or any combination thereof.

Processes for Producing Multilayer Blown Films

Processes for producing multilayer blown films also are disclosed herein. One such process can comprise:
(i) introducing into a blown film coextrusion die:
(a) a core layer flow having a first side and a second side,
(b) an inner layer flow positioned on the first side of the core layer flow, and (c) an outer layer flow positioned on the second side of the core layer flow; and (ii) blowing a coextruded flow exiting the die at a blow-up ratio in a range from about 1.5 to about 4 to produce the multilayer blown film.

In an embodiment, the resulting multilayer blown film can have a MD:CD shrink ratio in a range of from about 4:1 to about 30:1, and/or the MD shrink of the multilayer blown film can be greater than about 60%, and/or the CD shrink of the multilayer blown film can be in a range from 0% to about 15%.

In another embodiment, the core layer flow can comprise an ethylene polymer, e.g., any ethylene polymer described herein. Further, the inner layer flow and the outer layer flow, independently, can comprise any stryene/butadiene copolymer disclosed herein, any conjugated diene monovinylarene block copolymer disclosed herein, or any coupled multimodal conjugated diene monovinylarene block copolymer disclosed herein, etc.

The multilayer, or coextruded, blown film can be produced using any traditional blown film equipment (extruders, die, etc.), which are well known to those of skill in the art. Such is described, for example, in the *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Additionally, the process for producing a multilayer blown film described herein does not include nor comprise a double-bubble orientation step, and/or a machine direction orientation (MDO) step, and/or a tenter frame orientation step. These additional steps (and the associated equipment) can add additional cost and complexity to the film production process and, therefore, are not needed. Hence, in the present invention, no post-extrusion (blown film extrusion) orientation process steps are necessary.

As the traditional blown film process applies to the multilayer blown films contemplated herein, the blow-up ratio employed generally can be in a range from about 1.5 to about 4. In another embodiment, the blow-up ratio can be in the range from about 2 to about 3. In yet another embodiment, the blow-up ratio can be in the range from about 1.7 about 3.5, In still another embodiment, the blow-up ratio can be in the range from about 2 to about 2.8, or from about 2 to about 2.6.

Moreover, in some embodiments, the MD shrink can be generally unaffected by the blow-up ratio, or alternatively, can decrease slightly as the blow-up ratio increases. In other embodiments, the CD shrink can be impacted by and/or correlated with the blow-up ratio, e.g., the CD shrink can generally increase as the blow-up ratio increases. Accordingly, while not being bound by theory. Applicants believe that the CD shrink of a multilayer blown film can be adjusted and/or controlled by changing the blow-up ratio used to produce the multilayer blown film.

Articles of Manufacture

Multilayer blown films described herein can be used to produce various articles of manufacture. For instance, labels can be formed from and/or can comprise a multilayer blown film in accordance with this invention. Illustrative and non-limiting labels can include shrink sleeve labels, roll fed shrink labels, and the like As an example, the multilayer blown film can be printed on the inner layer and/or on the outer layer using various known processes (e.g., flexographic, rotogravure, etc.), and optionally laminated to another film of the same or different type, to form a printed label.

In another embodiment, an article of manufacture encompassed herein can comprise a container or a package and a label, the label comprising a multilayer blown film. In this regard, the container or the package can be a bottle, a can, a canister, a tube, a cup, or a box, and the like, but is not limited thereto. The label can be applied or affixed to the container or package using any suitable means known to those of skill in the art (e.g., roll fed labeling machinery).

In yet another embodiment, an article of manufacture can comprise a container or a package and a label or a multilayer blown film. In this regard, the container or the package can be a collection (or plurality) of bottles, cans, canisters, tubes, cups, or boxes, and the like, or combinations thereof. In this application, the label or multilayer film can serve as a bundling wrap for the various collection or plurality of items.

EXAMPLES

The Invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Examples 1-5

Property Comparison of 3-Layer Blown Films

Three-layer blown films were produced using standard coextrusion blown film equipment. The extruder for the core layer had a 3.5-inch diameter and a 30:1 length-to-diameter (L/D) ratio, and the extruder for the inner layer and outer layer had a 2-inch diameter and a 30:1 L/D ratio. Melt temperatures were approximately 400° F. The coextrusion die had an 8-inch diameter and the die gap was 60 mils. The blow-up ratio (BUR) was 2.5:1.

Films were produced at a nominal thickness of 1.5 mils. The core layer was 70% of the total thickness, and the inner layer and the outer layer were the same polymer composition, and each constituted about 15% of the total thickness. Table I summarizes the compositions of each of the layers of the blown films of Examples 1-5. Table II compares the properties of the blown films of Examples 1-5.

Figure 6:
FIG. 6 presents a plot of the 60° gloss for the 3-layer blown films of Examples 1-5.
Figure 7:
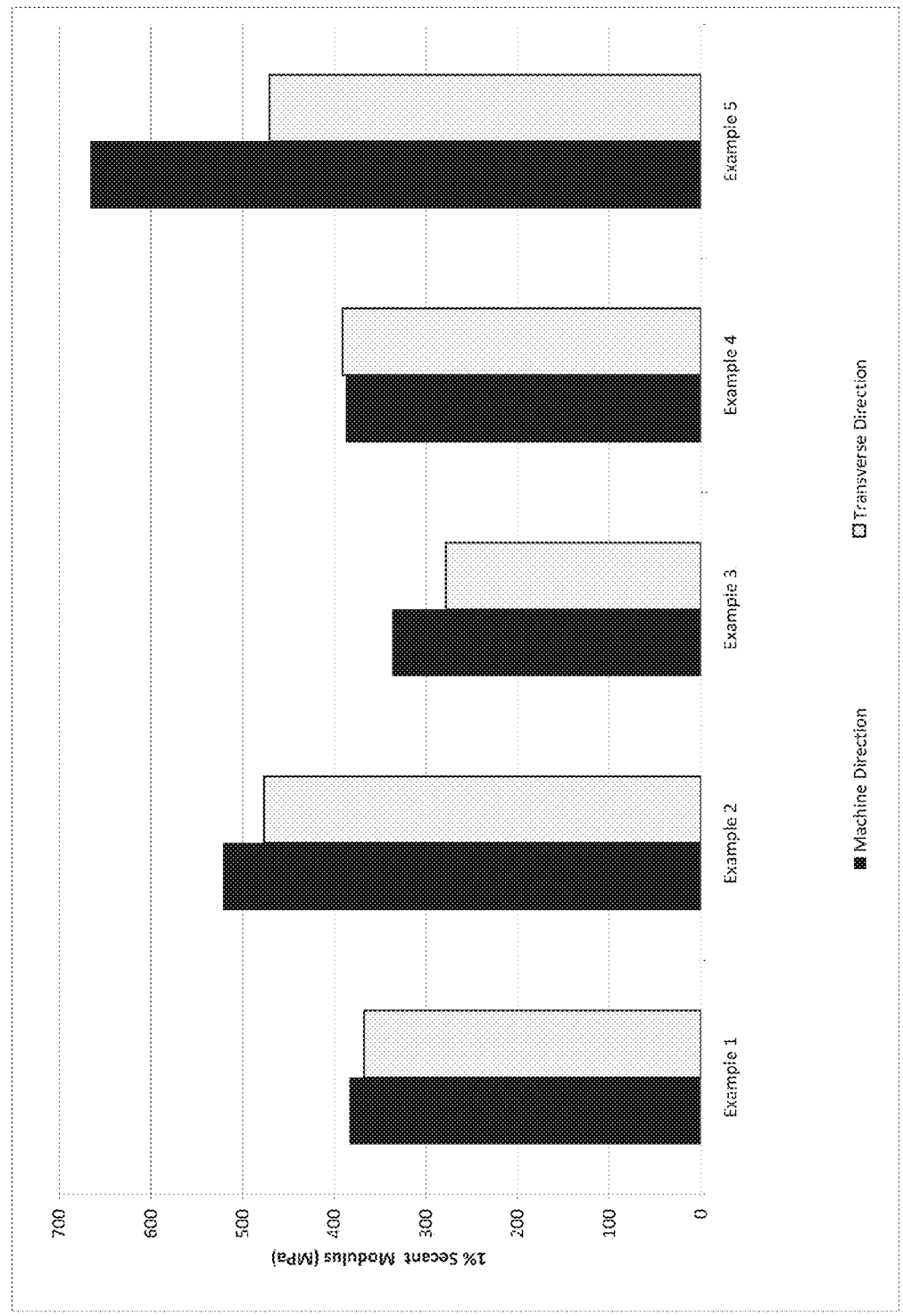
FIG. 7 presents a plot of the 1% secant modulus, in the machine direction and cross (transverse) direction, for the 3-layer blown films of Examples 1-5.

FIG. 5 and FIG. 6 are plots comparing the haze and the 60° gloss, respectfully, of the 3-layer blown films of Examples 1-5. Each of the multilayer blown films had haze values less than 4.5% and 60° gloss values of over 140%. FIG. 7 is a plot comparing the 1% secant modulus in the MD and CD for the 3-layer blown films of Examples 1-5. Generally, these films had modulus (MD and CD) values near or above 300 MPa (about 43,500 psi). The film of Example 2 had modulus values (MD and CD) over 450 MPa (about 65,000 psi).

Figure 8:
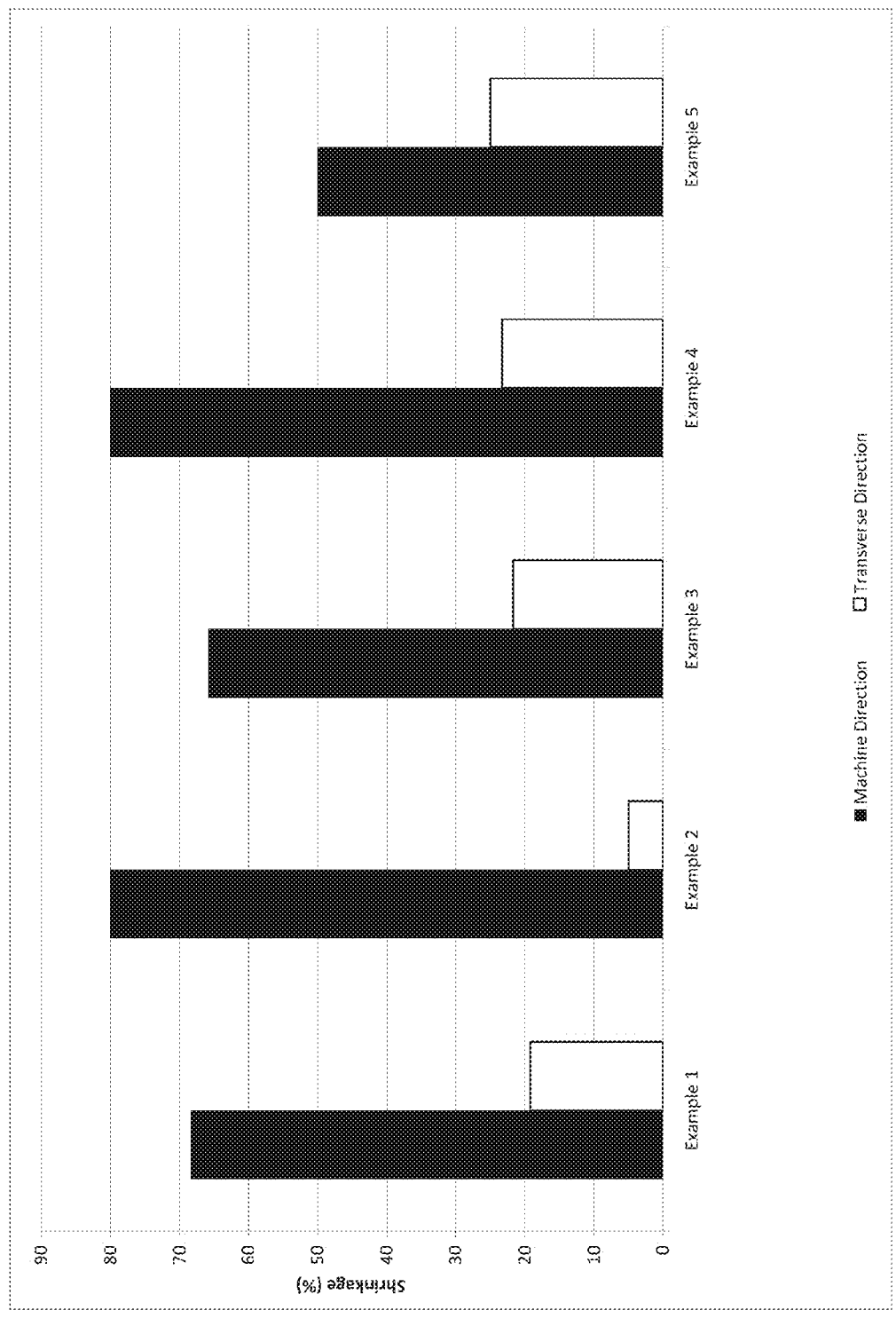
FIG. 8 presents a plot of the percentage shrink, in the machine direction and cross (transverse) direction, for the 3-layer blown films of Examples 1-5.

FIG. 8 is a plot comparing the percentage shrink at 150° C. In the MD and CD for the 3-layer blown films of Examples 1-5. The film of Example 2 demonstrated a unique and unexpected imbalance of MD and CD shrink, e.g., high MD shrink and low CD shrink. The MD shrink for the film of Example 2 was about 80%, while the CD shrink was less than about 5%.

Figure 9:
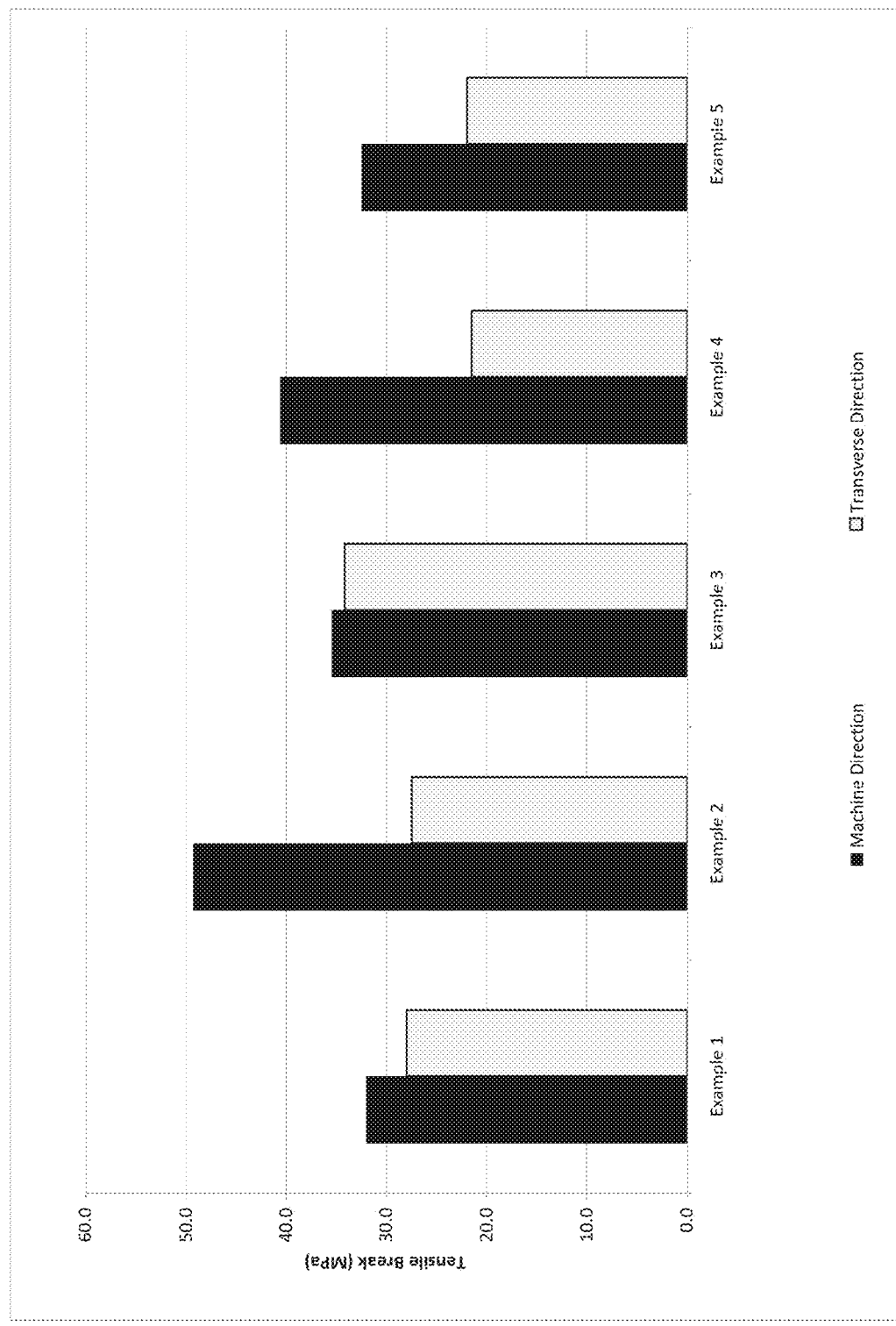
FIG. 9 presents a plot of the tensile strength at break, in the machine direction and cross (transverse) direction, for the 3-layer blown films of Examples 1-5.
Figure 10:
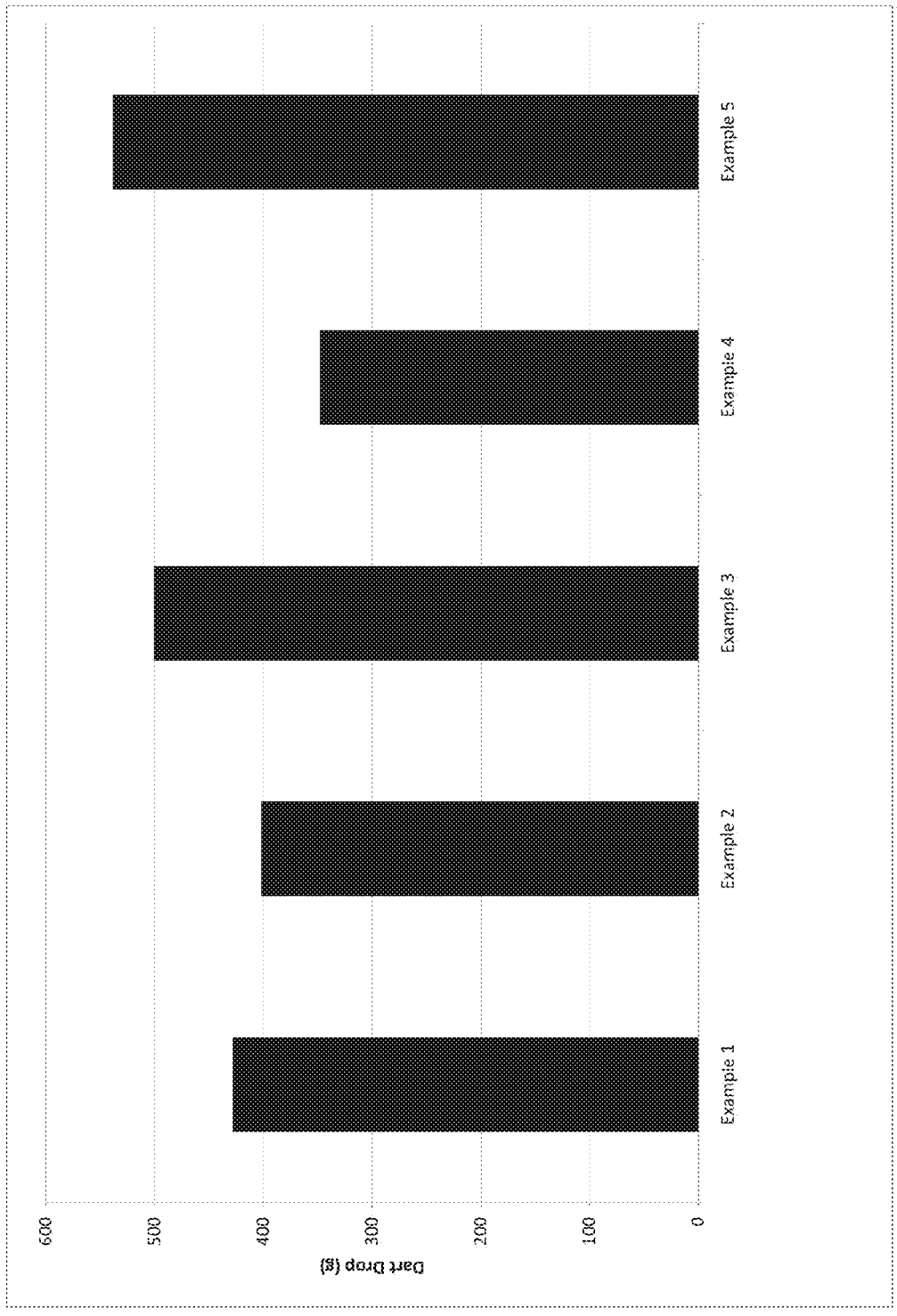
FIG. 10 presents a plot of the dart impact strength for the 3-layer blown films of Examples 1-5.

FIG. 9 is a plot comparing the tensile strength at break in the MD and CD for the 3-layer blown films of Examples 1-5. The film of Example 2 had the highest MD tensile strength of these films. FIG. 10 is a plot comparing the dart impact strength of the 3-layer blown films of Examples 1-5. Each of these films had dart impact values of over 300 g.

TABLE I

Blown Film Structures for Examples 1-5

| Example | Core Layer | Inner Layer and Outer Layer Blend | |
|---|---|---|---|
| 1 | LLDPE 7109<br>MI - 0.9 g/10 min<br>Density - 0.918 | 97% SBC KR53<br>MFR - 10 g/10 min<br>Density - 1.01<br>Vicat ~61° C. | 3% HIPS 7800<br>MFR - 3.6 g/10 min<br>Particle Size ~1.5 μm |
| 2 | LDLPE TR-257<br>MI - 0.2 g/10 min<br>Density - 0.923 | 97% SBC KR53<br>MFR - 10 g/10 min<br>Density - 1.01<br>Vicat ~61° C. | 3% HIPS 7800<br>MFR - 3.6 g/10 min<br>Particle Size ~1.5 μm |
| 3 | mLLDPE D143<br>MI - 1.4 g/10 min<br>Density - 0.916 | 97% SBC KR53<br>MFR - 10 g/10 min<br>Density - 1.01<br>Vicat ~61° C. | 3% HIPS 7800<br>MFR - 3.6 g/10 min<br>Particle Size ~1.5 μm |
| 4 | LDPE 5628<br>MI - 0.4 g/10 min<br>Density - 0.922 | 97% SBC KR53<br>MFR - 10 g/10 min<br>Density - 1.01<br>Vicat ~61° C. | 3% HIPS 7800<br>MFR - 3.6 g/10 min<br>Particle Size ~1.5 μm |
| 5 | 99% SBC KR53<br>1% HIPS 7800<br>(same an inner<br>and outer layers) | 99% SBC KR53<br>MFR - 10 g/10 min<br>Density - 1.01<br>Vicat ~61° C. | 1% HIPS 7800<br>MFR - 3.6 g/10 min<br>Particle Size ~1.5 μm |

Notes on Table I:
The ethylene polymer resins are commercially available from Chevron Phillips Chemical Company LP.
K-Resin® SBC KR53 is commercially available from Chevron Phillips Chemical Company LP.
HIPS 7800 is commercially available from INEOS Styrenics, and was added to reduce film blocking. The particle size listed is for the elastomeric component present in the HIPS polymer.

TABLE II

Property Summary for the Blown Film Structures of Examples 1-5

| | | | Example 1 | Example 2 | Example 3 | Example 4 | Example 5 |
|---|---|---|---|---|---|---|---|
| Elmendorf Tear | g/mil | MD | 64.2 | 81.5 | 143.7 | 163.4 | 75.3 |
| | | TD | 39.4 | 242.7 | 48.7 | 143.2 | 101.6 |
| Tensile Elongation | % | MD | 307% | 282% | 357% | 117% | 229% |
| | | TD | 460% | 476% | 444% | 360% | 201% |
| Tensile Yield | MPa | MD | 14.9 | 17.1 | 13.2 | 40.6 | 20.7 |
| | | TD | 13.6 | 16.2 | 12.2 | 13.8 | 16.9 |
| Tensile Break | MPa | MD | 32.0 | 49.2 | 35.4 | 40.6 | 32.4 |
| | | TD | 28.0 | 27.5 | 34.2 | 21.5 | 21.9 |
| Secant Modulus | MPa | MD | 384 | 522 | 337 | 387 | 666 |
| | | TD | 367 | 477 | 278 | 391 | 471 |
| Haze | % | | 4.1% | 3.2% | 2.5% | 2.0% | 0.2% |
| Gloss - 60° | % | | 148% | 147% | 152% | 151% | 166% |
| Dart Impact | g | | 428 | 402 | 500 | 348 | 538 |
| Shrinkage - 150° C. | % | MD | 68 | 80 | 66 | 80 | 50 |
| | | TD | 19 | 5 | 22 | 23 | 25 |

Examples 6-9

Properly Comparison of 3-Layer Blown Films at Different Blow-Up Ratios ("BUR's")

Three-layer blown films were produced using standard coextrusion blown film equipment. The extruder for the core layer had a 3.5-inch diameter and a 30:1 L/D ratio, and the extruder for the inner layer and outer layer had a 2-inch diameter and a 30:1 L/D ratio. Melt temperatures were approximately 380° F. for the inner/outer layers and 400° F. for the core layer. The coextrusion die had an 8-inch diameter and the die gap was 60 mils. Examples 6-9 were produced at BUR's of 1.35:1, 2:1, 3:1, and 4:1, respectively.

Figure 11:
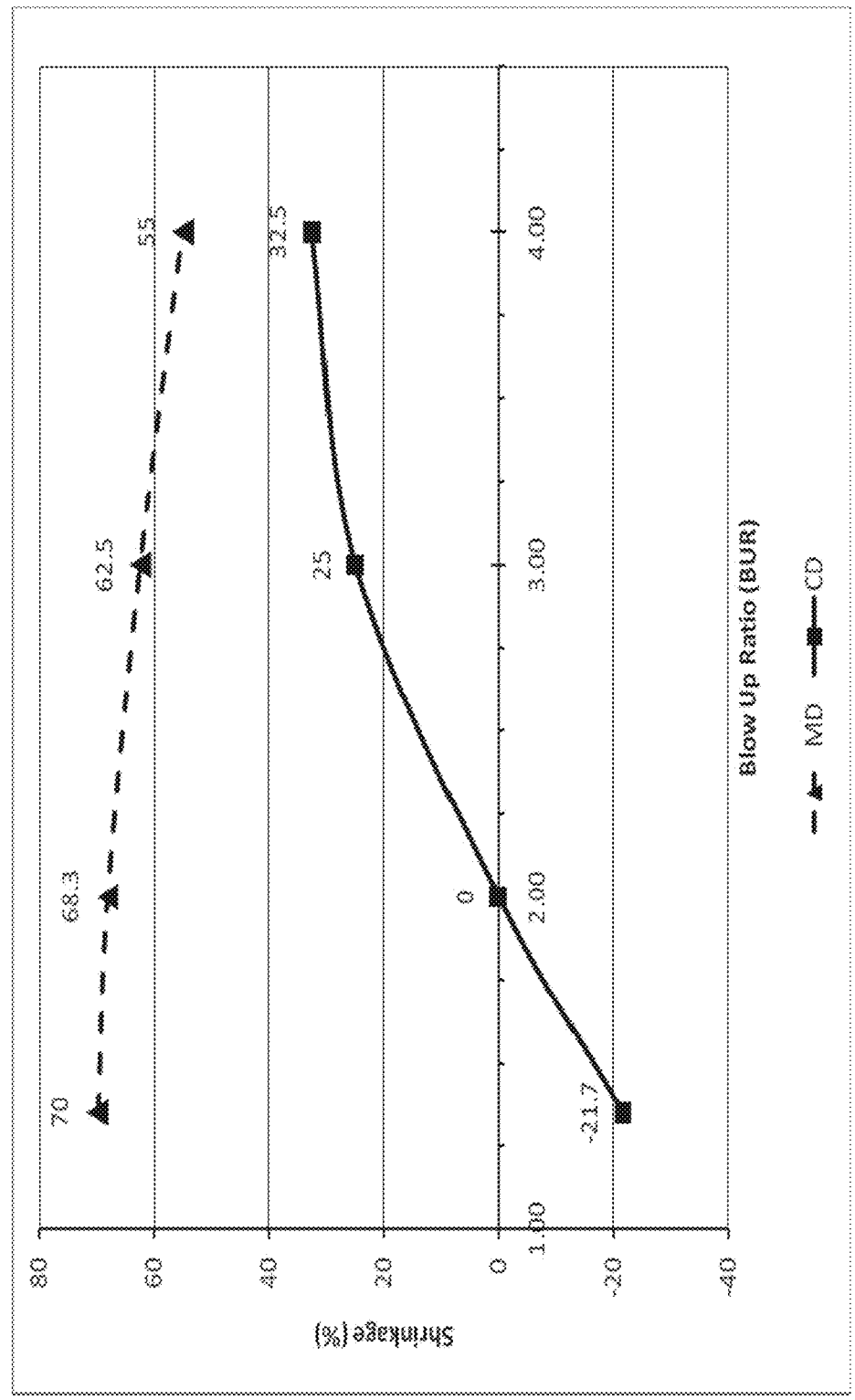
FIG. 11 presents a plot of the percentage shrink, in the machine direction and cross (transverse) direction, for the 3-layer blown films of Examples 6-9 produced at a range of blow-up ratios.

Films were produced at a nominal thickness of 2 mils. The core layer was 80% of the total thickness, and the inner layer and the outer layer were the same polymer composition, and each constituted about 10% of the total thickness. The core layer was Marflex® TR-257 polyethylene. The inner layer and the outer layer contained 98% KR52 K-Resin® SBC and 2% SKR17, both available from Chevron Phillips Chemical Company LP. Table III compares the properties of the blown films of Examples 6-9. FIG. 11 is a plot comparing the percentage shrink at 150° C. In the MD and CD for the 3-layer blown films of Examples 6-9, at respective BUR's of 1.35:1, 2:1, 3:1, and 4:1. FIG. 11 demonstrates that the CD shrink increases rapidly with increasing blow-up ratio for these blown films.

TABLE III

Property Summary for the Blown Film Structures of Examples 6-9

| Example | BUR | Dart Drop (g) | Elmendorf Tear (g/mil) MD | Elmendorf Tear (g/mil) CD | Shrinkage (%, @150° C.) MD | Shrinkage (%, @150° C.) CD | Shrink Tension (Pa, 150° C.) MD | Shrink Tension (Pa, 150° C.) CD | 1% Secant Modulus (PSI) MD | 1% Secant Modulus (PSI) CD |
|---|---|---|---|---|---|---|---|---|---|---|
| 6 | 1.35 | 176 | 15.3 | 435.2 | 70 | −21.7 | 209,257 | 78,482 | 121,200 | 123,465 |
| 7 | 2.00 | 260 | 27.9 | 320.2 | 68.3 | 0 | 222,241 | 92,530 | 118,609 | 115,387 |
| 8 | 3.00 | 448 | 40.2 | 160.3 | 62.5 | 25 | 182,347 | 95,127 | 110,186 | 116,051 |
| 9 | 4.00 | 418 | 47.2 | 171.7 | 55 | 32.5 | 141,408 | 105,094 | 112,962 | 115,554 |

We claim:

1. A process for producing a multilayer blown film, the process comprising:
   (i) introducing into a blown film coextrusion die:
      (a) a core layer flow having a first side and a second side, the core layer flow comprising an ethylene polymer characterized by:
         a MI in a range from about 0.01 to about 2 g/10 min;
         a ratio of HLMI/MI in a range from about 50 to about 300; and
         a ratio of Mw/Mn in a range from about 5 to about 30;
      (b) an inner layer flow positioned on the first side of the core layer flow, the inner layer flow comprising a first conjugated diene monovinylarene block copolymer; and
      (c) an outer layer flow positioned on the second side of the core layer flow, the outer layer flow comprising a second conjugated diene monovinylarene block copolymer; and
   (ii) blowing a coextruded flow exiting the die at a blow-up ratio in a range from about 1.5 to about 4 to produce the multilayer blown film;
   wherein the multilayer blown film has a MD shrink greater than about 60% and a CD shrink in a range from 0% to about 15% at 150° C.

2. The process of claim 1, wherein the blow-up ratio is in a range from about 2 to about 3.

3. The process of claim 1, wherein the process does not comprise a double-bubble orientation step, a machine direction orientation step, or a tenter frame orientation step.

4. The process of claim 1, wherein the multilayer blown film has a MD shrink in a range from about 65% to about 90% and a CD shrink in a range from about 1% to about 10% at 150° C.

5. The process of claim 1, wherein the multilayer blown film has a MD:CD shrink ratio in a range from about 4:1 to about 30:1 at 150° C.

6. The process of claim 1, wherein the ethylene polymer is an ethylene/α-olefin copolymer.

7. The process of claim 6, wherein the ethylene/α-olefin copolymer is characterized by:
   a MI in a range from about 0.1 to about 0.5 g/10 min;
   a ratio of HLMI/MI in a range from about 60 to about 140;
   a Mw in a range from about 75,000 to about 500,000 g/mol;
   a ratio of Mw/Mn in a range from about 7 to about 15; and
   a density in a range from about 0.88 to about 0.94 g/cm$^3$.

8. The process of claim 1, wherein:
   the first conjugated diene monovinylarene block copolymer has from about 55 to about 95 weight percent monovinylarene monomer content, based on the total weight of the block copolymer; and
   the second conjugated diene monovinylarene block copolymer has from about 55 to about 95 weight percent monovinylarene monomer content, based on the total weight of the block copolymer.

9. The process of claim 8, wherein:
   the first conjugated diene monovinylarene block copolymer comprises a first styrene butadiene block copolymer; and
   the second conjugated diene monovinylarene block copolymer comprises a second styrene butadiene block copolymer.

10. The process of claim 1, wherein:
    the inner layer flow further comprises a general purpose polystyrene, a high impact polystyrene, a cyclic olefin copolymer, a styrene isoprene styrene copolymer, a styrene ethylene-butylene styrene polymer, or any combination thereof;
    the outer layer flow further comprises a general purpose polystyrene, a high impact polystyrene, a cyclic olefin copolymer, a styrene isoprene styrene copolymer, a styrene ethylene-butylene styrene polymer, or any combination thereof;
    or both.

11. The process of claim 1, wherein the multilayer blown film further comprises an additive selected from an antioxidant, an acid scavenger, an antiblock additive, a slip additive, a colorant, a filler, a polymer processing aid, a UV inhibitor, or any combination thereof.

12. The process of claim 1, wherein the inner layer flow and the outer layer flow comprise different polymers or blends of polymers.

13. A process for producing a multilayer blown film, the process comprising:
    (i) introducing into a blown film coextrusion die:
       (a) a core layer flow having a first side and a second side, the core layer flow comprising an ethylene polymer, wherein the ethylene polymer is an ethylene/1-butene, ethylene/1-hexene, or ethylene/1-octene copolymer characterized by:
          a MI in a range from about 0.01 to about 2 g/10 min;
          a ratio of HLMI/MI in a range from about 50 to about 300; and
          a ratio of Mw/Mn in a range from about 5 to about 30;
       (b) an inner layer flow positioned on the first side of the core layer flow, the inner layer flow comprising a first conjugated diene monovinylarene block copolymer; and
       (c) an outer layer flow positioned on the second side of the core layer flow, the outer layer flow comprising a second conjugated diene monovinylarene block copolymer; and
    (ii) blowing a coextruded flow exiting the die at a blow-up ratio in a range from about 1.5 to about 4 to produce the multilayer blown film;
    wherein the multilayer blown film has a MD shrink greater than about 60% and a CD shrink in a range from 0% to about 15% at 150° C.

14. The process of claim 13, wherein the multilayer blown film has a MD:CD shrink ratio in a range from about 4:1 to about 30:1 at 150° C.

15. The process of claim 13, wherein the blow-up ratio is in a range from about 2 to about 3.

16. The process of claim 13, wherein the process does not comprise a double-bubble orientation step, a machine direction orientation step, or a tenter frame orientation step.

17. The process of claim 13, wherein the ethylene/1-butene, ethylene/1-hexene, or ethylene/1-octene copolymer is characterized by:
    a MI in a range from about 0.1 to about 0.5 g/10 min;
    a ratio of HLMI/MI in a range from about 60 to about 140; and
    a ratio of Mw/Mn in a range from about 7 to about 15.

18. The process of claim 13, wherein the ethylene/1-butene, ethylene/1-hexene, or ethylene/1-octene copolymer is characterized by:

a MI in a range from about 0.1 to about 0.5 g/10 min;
a ratio of HLMI/MI in a range from about 60 to about 140;
a Mw in a range from about 75,000 to about 500,000 g/mol;
a ratio of Mw/Mn in a range from about 7 to about 15; and
a density in a range from about 0.88 to about 0.94 g/cm$^3$.

19. The process of claim 13, wherein the multilayer blown film has:
a MD shrink in a range from about 65% to about 90%;
a CD shrink in a range from 1% to about 10%;
an average film thickness in a range from about 0.5 to about 5 mils;
a haze of less than about 10%;
a 60° gloss of greater than about 100%; and
a 1% MD secant modulus greater than about 50,000 psi.

20. The process of claim 13, wherein:
the first conjugated diene monovinylarene block copolymer has from about 55 to about 95 weight percent monovinylarene monomer content, based on the total weight of the block copolymer, and the first conjugated diene monovinylarene block copolymer comprises a first styrene butadiene block copolymer; and
the second conjugated diene monovinylarene block copolymer has from about 55 to about 95 weight percent monovinylarene monomer content, based on the total weight of the block copolymer, and the second conjugated diene monovinylarene block copolymer comprises a second styrene butadiene block copolymer.

* * * * *